No. 775,446. PATENTED NOV. 22, 1904.
T. C. DUNLAP.
MOTOR FRAME.
APPLICATION FILED FEB. 27, 1904.
NO MODEL. 5 SHEETS—SHEET 3.
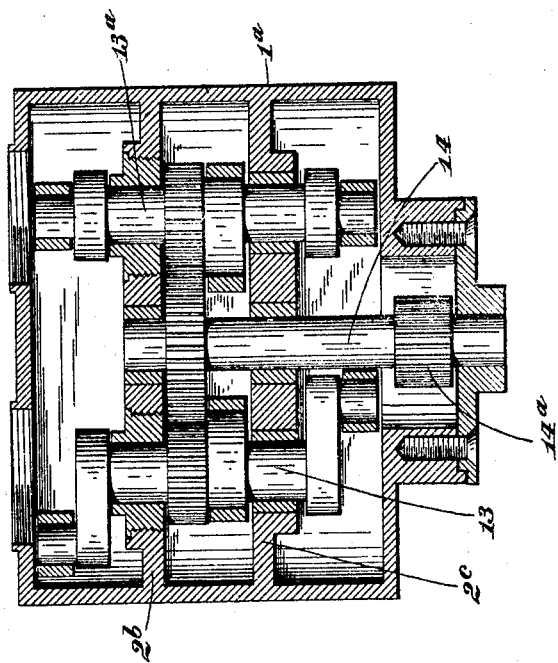
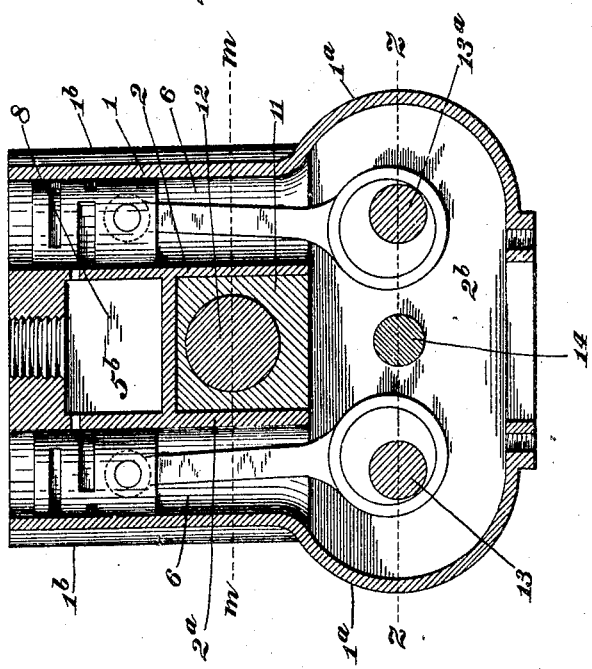
Witnesses
Inventor
Thaddeus C. Dunlap
by Finckel & Finckel
his Attorneys

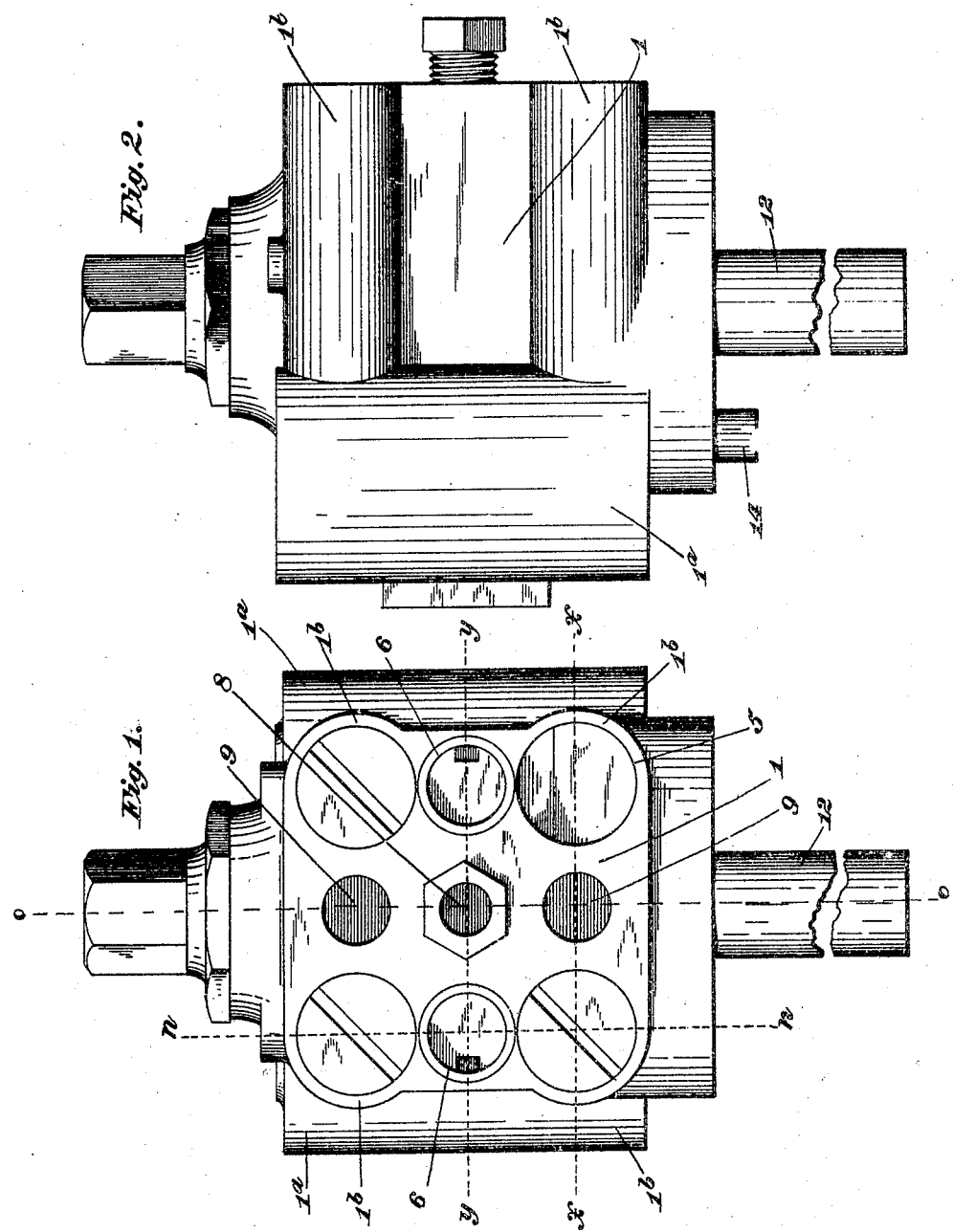

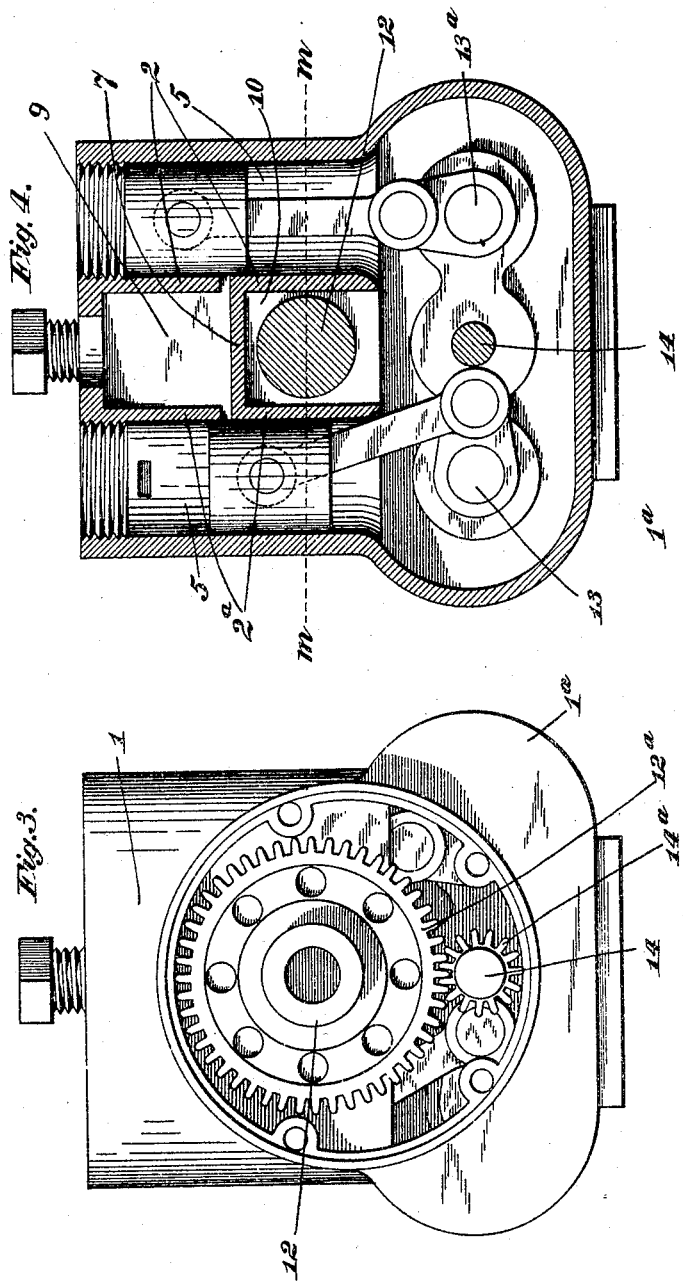

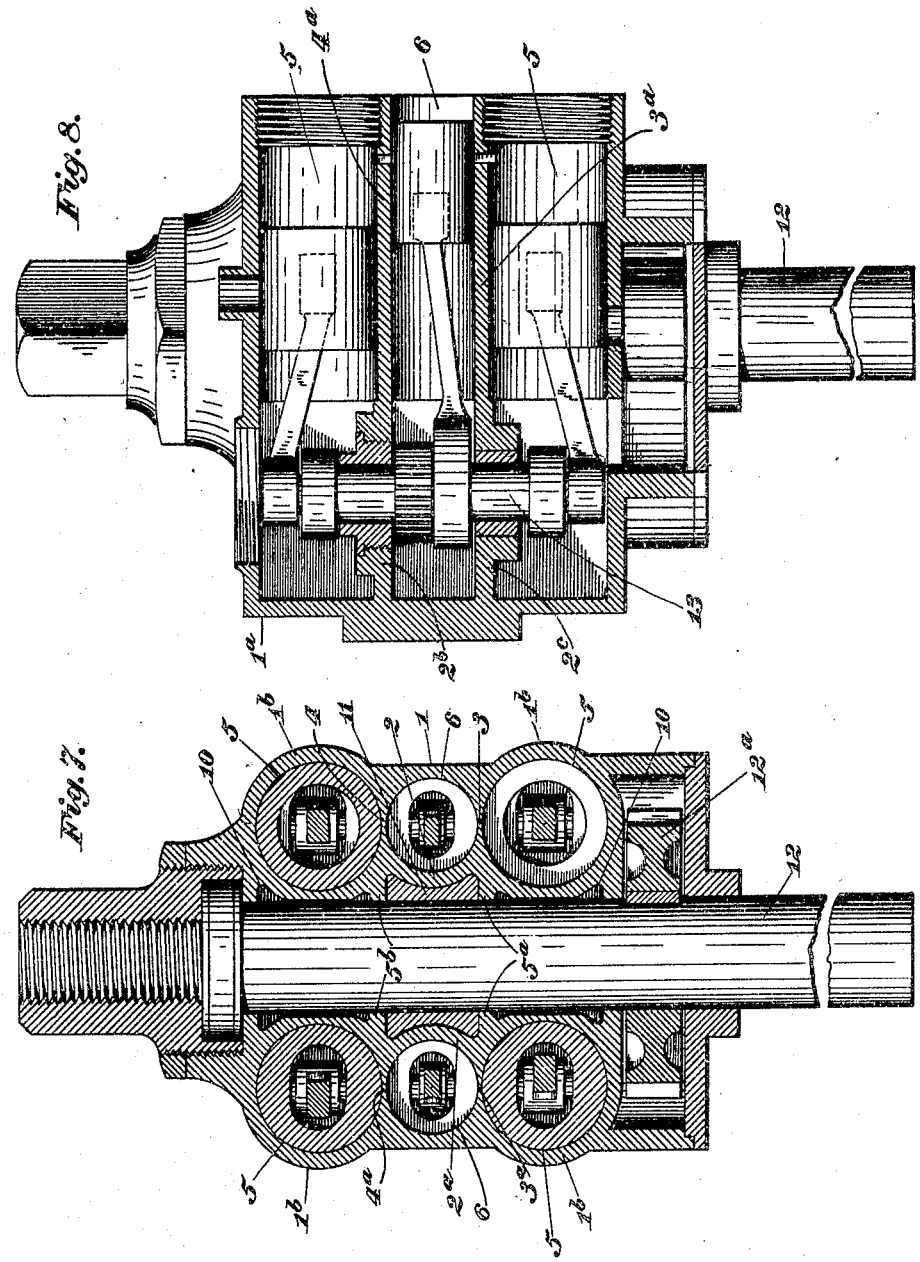

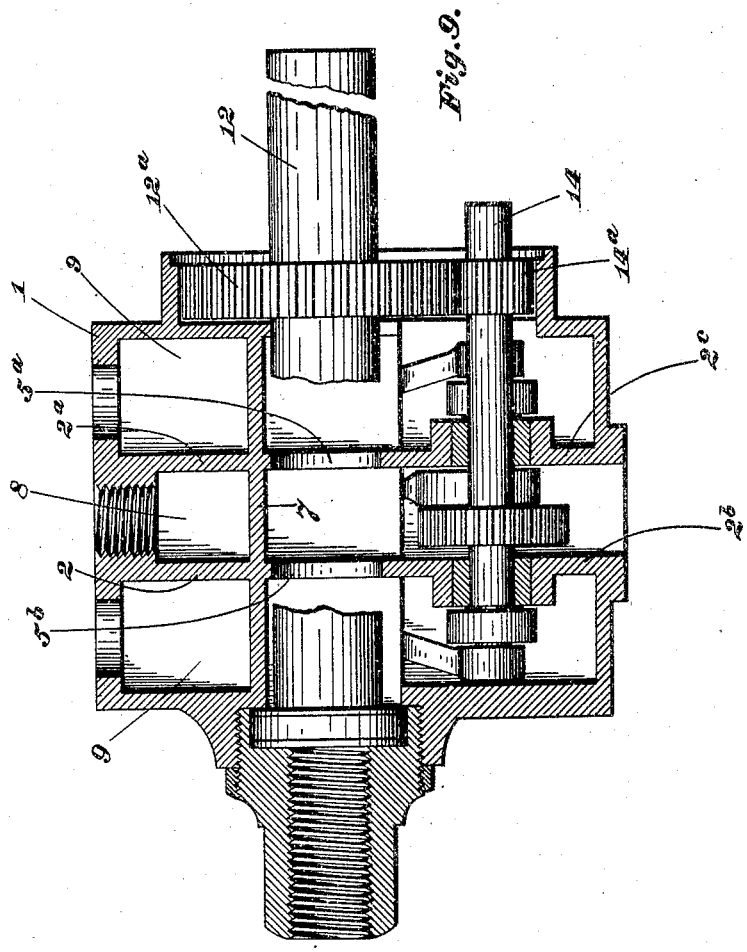

No. 775,446.

Patented November 22, 1904.

UNITED STATES PATENT OFFICE.

THADDEUS C. DUNLAP, OF COLUMBUS, OHIO.

MOTOR-FRAME.

SPECIFICATION forming part of Letters Patent No. 775,446, dated November 22, 1904.

Application filed February 27, 1904. Serial No. 195,567. (No model.)

*To all whom it may concern:*

Be it known that I, THADDEUS C. DUNLAP, a citizen of the United States, residing at Columbus, in the county of Franklin and State of Ohio, have invented certain new and useful Improvements in Motor Frames or Casings; and I do hereby declare the following to be a full, clear, and exact description of the invention, such as will enable others skilled in the art to which it appertains to make and use the same.

This invention relates to motors, and will be especially useful in pneumatically-operated drills and the like.

Heretofore air-drills after a brief period of use have lost to a considerable degree their power and efficiency. This, I think, was not altogether due to a diminution of piston area or leakage, but rather to a faulty alinement and connection of the working parts resulting from a disarrangement, even though slight, of the parts of the frame containing the bearings of the working parts.

The object of the present invention, therefore, is to provide for a motor a frame or casing in which it shall be impossible for its several parts to shift out of their predetermined relation to each other; and the invention consists in the construction hereinafter described and claimed.

Because my invention herein claimed relates solely to the frame or casing I do not deem it necessary to minutely describe the operative parts mounted in such frame or casing, it being sufficient to designate their position with respect to the casing.

In the accompanying drawings, illustrating one embodiment of the invention, Figure 1 is a view of the right-hand end in elevation with the bottom plate and one cylinder-head removed. Fig. 2 is a front view in elevation with bottom plate removed; Fig. 3, a view of the under side with bottom plate removed. Fig. 4 is a sectional view taken on the plane $x\ x$, Fig. 1, looking up. Fig. 5 is a sectional view taken on the plane $y\ y$, Fig. 1, looking up. Fig. 6 is a sectional view on the plane $z\ z$, Fig. 5. Fig. 7 is a sectional view on the plane $m\ m$, Figs. 4, 5, looking up. Fig. 8 is a sectional view on the plane $n\ n$, Fig. 1, looking to the right, some of the working parts being removed for the sake of clearness. Fig. 9 is a section of the shell on the plane $o\ o$, Fig. 1.

The general form of the outer casing 1 is cubical, with a rather large bulging portion $1^a$ at one end to provide room for the location and revolution of the crank-shafts and with smaller bulges $1^b$ at the sides for the outer walls of the cylinders. Within the outer main cubical part of the casing are formed the vertical walls 2 and $2^a$ and the horizontal walls 3 $3^a$ and 4 $4^a$, that divide the opposite sides of the casing into four cylinders 5 and two valve-chambers 6, all parallel to each other, and also walls $5^a$ and $5^b$, dividing the space itself into pockets and chambers, as hereinafter described. The space between the walls 2 and $2^a$ is divided vertically by a wall 7, lying about midway of the cubical part of the casing and in a plane at right angles to the plane of the walls 2 and $2^a$, thus in connection with the walls $5^a$ and $5^b$ dividing this space at one side into an intake-chamber 8 and two exhaust-chambers 9 and at the outer side into pockets 10 for the reception of babbitt 11, in which runs the tool-spindle 12. Babbitt is shown in one of said pockets only; but it can be provided in the others.

The walls 3 $3^a$ 4 $4^a$ $5^a$ $5^b$ are extended into and through the crank-shaft chamber formed by the large bulging portion $1^a$ of the outer casing, said extensions being marked $2^b$ and $2^c$, and they are integral with said bulging portion of the outer shell, as with the walls 3 $3^a$ 4 $4^a$ $5^a$ $5^b$. These extensions $2^b$ and $2^c$ can be provided with bushings for the crank-shafts, which latter are designated 13 and $13^a$. The walls $2^b$ and $2^c$ also afford bearings for the intermediate shaft 14, through which power is transmitted by appropriate gearing from the crank-shafts through a pinion $14^a$ on the intermediate shaft to a spur-gear $12^a$ on the spindle 12.

The outer shell is shown to be tapped at the ends of the cylinders for the reception of threaded cylinder-heads. It is also tapped to provide openings through which the crank-shafts and other parts can be inserted. There are also shown to be provided ordinary inlet and exhaust ports for the cylinders and also other openings for the insertion and location of parts; but it will be observed that the bearings or housings of the operative parts are rigid with respect to each other and that this relation cannot be disturbed except so far as ordinary wear on the bearings may effect this result.

Deviations from the precise forms shown can be made without departing from the gist of the invention.

What I claim, and desire to secure by Letters Patent, is—

1. A casing for a pneumatic motor comprising in combination a main outer shell, interior walls integral with the outer shell dividing the same into cylinders and valve-chambers, and a wall also integral with the outer shell and with the aforesaid walls but at right angles thereto dividing the space between them into intake and exhaust chambers and a pocket or pockets for the reception of a bearing for a driven spindle.

2. A casing for a pneumatic motor comprising in combination a main outer shell having integral therewith a shell forming a crank-chamber, interior walls integral with the outer shell dividing the same into cylinders and valve-chambers, said walls extending into the crank-chamber to afford bearings for crank-shafts and made integral with the shell of the crank-chamber as well as with the main outer shell, and a wall also integral with the outer shell and with the walls which divide the interior into cylinder and valve-chambers dividing the space between them into intake and exhaust chambers, and a pocket or pockets for the reception of a bearing for the driven spindle.

3. In a fluid-motor, a casing comprising in combination a main shell and integral therewith a shell forming an inclosed crank-chamber, interior walls integral with the main casing dividing the same into cylinders and valve-chambers, walls extending integrally with and from said interior walls into the crank-chamber and provided with bearings affording the sole supports for the crank-shafts of the motor.

4. A casing for a pneumatic motor comprising in combination, a main outer shell and a crank-chamber at the side thereof, interior walls integral with the main outer shell dividing the same into cylinders and valve-chambers, said walls extending into the crank-chamber and affording the sole supports for the crank-shafts, and a wall also integral with the walls which divide the interior of the main shell into cylinder-chambers but at right angles thereto, dividing the space between into intake and exhaust chambers, and a pocket or pockets for the reception of a bearing for the driven spindle.

In testimony whereof I affix my signature in presence of two witnesses.

THADDEUS C. DUNLAP.

Witnesses:
  BENJ. FINCKEL,
  SAMUEL W. LATHAM.